(12) United States Patent
Steeneken et al.

(10) Patent No.: US 8,203,402 B2
(45) Date of Patent: Jun. 19, 2012

(54) ELECTRONIC DEVICE

(75) Inventors: Peter G. Steeneken, Valkenswaard (NL); Jozef Thomas Martinus Van Beek, Rosmalen (NL); Theodoor Rijks, Eindhoven (NL)

(73) Assignee: Epcos AG, Munich (DE)

( * ) Notice: Subject to any disclaimer, the term of this patent is extended or adjusted under 35 U.S.C. 154(b) by 469 days.

(21) Appl. No.: 11/718,137

(22) PCT Filed: Oct. 24, 2005

(86) PCT No.: PCT/IB2005/053476
§ 371 (c)(1),
(2), (4) Date: May 4, 2009

(87) PCT Pub. No.: WO2006/046193
PCT Pub. Date: May 4, 2006

(65) Prior Publication Data
US 2009/0211885 A1    Aug. 27, 2009

(51) Int. Cl.
*H01H 51/22* (2006.01)
(52) U.S. Cl. ............................................ 335/78; 335/83
(58) Field of Classification Search .............. 335/6, 127, 335/202, 78, 83
See application file for complete search history.

(56) References Cited

U.S. PATENT DOCUMENTS

| 5,454,904 A | 10/1995 | Ghezzo et al. |
| 5,531,018 A | 7/1996 | Saia et al. |
| 6,366,186 B1 * | 4/2002 | Hill et al. ........................ 335/78 |
| 6,557,413 B2 | 5/2003 | Nieminen et al. |
| 6,634,232 B1 | 10/2003 | Rettig et al. |
| 6,657,525 B1 * | 12/2003 | Dickens et al. ................. 335/78 |
| 6,875,936 B1 * | 4/2005 | Suzuki et al. .................. 200/181 |
| 6,880,235 B2 * | 4/2005 | Ma .................. 29/622 |
| 7,002,441 B2 * | 2/2006 | Pillans et al. ................... 335/78 |
| 2002/0145493 A1 * | 10/2002 | Wang .............................. 335/78 |
| 2002/0179421 A1 | 12/2002 | Williams et al. |
| 2003/0132824 A1 * | 7/2003 | Ma ................. 335/78 |
| 2003/0227361 A1 * | 12/2003 | Dickens et al. ................. 335/78 |
| 2004/0051929 A1 | 3/2004 | Sampsell et al. |

FOREIGN PATENT DOCUMENTS

| GB | 2353410 A | 2/2001 |
| JP | 09-213191 | 8/1997 |
| JP | 2000-173375 | 6/2000 |
| JP | 2000-306484 | 11/2000 |
| JP | 2003-512627 | 4/2003 |
| JP | 2008-227647 | 9/2008 |
| WO | WO 03/102989 | 12/2003 |
| WO | WO 03/105174 | 12/2003 |
| WO | 2004054088 A2 | 6/2004 |
| WO | 2004054088 A3 | 6/2004 |

* cited by examiner

*Primary Examiner* — Lincoln Donovan
*Assistant Examiner* — Alexander Talpalatskiy
(74) *Attorney, Agent, or Firm* — Slater & Matsil, L.L.P.

(57) ABSTRACT

The electronic device comprising a micro-electromechanical systems (MEMS) element at a first side of a substrate. The MEMS element includes a first electrode and a second electrode, that is part of a movable element and movable towards and from the first electrode between a first and a second position. The second electrode is separated from the first electrode by an air gap in its first position. The movable element includes a mechanical layer and an intermediate layer, in which the second electrode is defined. The second electrode is constituted by a plurality of sections in the intermediate layer, each of which is mechanically connected by a separate vertical interconnect to the mechanical layer.

18 Claims, 5 Drawing Sheets

ELECTRONIC DEVICE

TECHNICAL FIELD

The invention relates to an electronic device comprising a micro-electromechanical systems (MEMS) element, which MEMS element comprises a first electrode and a second electrode, that is part of a movable element and movable towards and from the first electrode, and that is separated from the first electrode by a gap in its opened position, which movable element comprises a mechanical layer and an intermediate layer, in which the second electrode is defined.

BACKGROUND

Microelectromechanical systems (MEMS) refer to a collection of micro-sensors and actuators, which can react to an environmental change under micro-circuit control. The integration of MEMS into traditional radio frequency (RF) circuits has resulted in systems with superior performance levels and lower manufacturing costs. The incorporation of MEMS based fabrication technologies into micro and millimetre wave systems offers viable routes to devices with MEMS actuators, antennas, switches and capacitors. The resultant systems operate with an increased bandwidth and increased radiation efficiency, reduced power consumption, and have considerable scope for implementation within the expanding area of wireless personal communication devices.

MEMS elements comprise a first and a second electrode of which the second electrode is movable to and from the first electrode between a first position and a second position. In the first position the MEMS element is opened and there is a gap, usually an air gap, between the first and the second electrode. In the second position, the MEMS element may be closed, such that there is no gap between the first and the second electrode, or the airgap has a minimum thickness. Such minimum thickness can be achieved with the provision of bumps with the desired thickness. A dielectric layer may be present on top of the first electrode, that is generally present on a substrate. This leads thereto that the first electrode does not make electrical contact with the second electrode in its closed position, but forms a capacitor therewith. The other electrode or electrodes may also be provided with dielectric layers or native oxides if so desired.

The fact that the second electrode must be movable, but still be incorporated in a mechanically stable construction results therein that the devices are usually provided with a mechanical layer of sufficient thickness and mechanical stability. This layer may be a metal layer, but is alternatively a piezoelectric layer, such as is known from GB-A 2,353,410.

A device as described in the opening paragraph is known from WO-A 2004/54088, particularly FIG. 11 thereof. Both the intermediate layer and the mechanical layer are herein made of aluminium. These layers are mutually attached by a vertical interconnect with a diameter small than that of the second electrode in the intermediate layer.

It is a disadvantage of the known device that the capacitance density in a second position is less than was expected on the basis of the available surface area. Hence, the effective tuning range is also reduced, and with the resulting reduced tuning range the MEMS element is not very competitive to alternative solutions for tunable capacitors and switches. Such an alternative is in particular the use of discrete switches like pindiodes and pHEMT transistors, if needed in combination with discrete or thin-film capacitors.

SUMMARY

It is therefore an object of the invention to provide a device of the kind mentioned in the opening paragraph with an improved tuning range.

This object is achieved in that the second electrode is constituted by a plurality of sections in the intermediate layer, each of which is mechanically connected by a separate vertical interconnect to the mechanical layer. In other words, the second electrode is segmented.

It was found in experiments leading to the invention, that there is a stress difference built up between the mechanical layer and the intermediate layer, even in the case that these layers comprise the same metal or alloy. The stress difference is thought to result from inherent stresses in the layers. The consequence of this stress difference is that the movable element with the second electrode is distorted when it is displaced towards the first electrode. As a result, the second electrode is not planar anymore, but bent. This results that the minimum distance between the first and the second electrode is reached only on a limited surface area, and hence the capacitance density effectively decreases. Now by dividing the second electrode in the intermediate layer in a number of independent sections, the bending effect is considerably reduced, and also, the stress is reduced. As a consequence, the capacitance density is increased, even although the surface area of the second electrode is reduced.

Consequently, the device of the invention has also a better thermal stability. It further may be miniaturized, as a consequence of the higher capacitance density and the better definition of the contact area.

In a preferred embodiment, the vertical interconnect has a smaller diameter than the section attached thereto in the intermediate layer. This reduces the stresses effectively even further. The smaller diameter is particularly present at the interface with the intermediate layer.

It is an advantage of the presence of such vertical interconnects that it offers a larger design freedom. In fact, a separation can be made between a front end with the first and second electrode defining the electrical function and a back end providing the mechanical construction that acts as a support and the actuator of the second electrode. This allows that the front end is defined rather independently of the back end. In other words, if in the back end a metal layer is replaced by a ceramic layer, this does not need to give rise to major changes in the front end. And the back end may thus be optimised for the parameters of mechanical support, and package and manufacturability on an industrial scale. Particularly for a piezoelectric MEMS element, the back end may well be provided by assembly instead of by deposition of individual layers.

Preferably the diameter of the interconnect is only 0.75 times the diameter of the corresponding section. And more preferably, the diameter of the interconnect is at least 0.25 times the diameter of the corresponding section. In the case that the interconnect is ring-shaped, its diameter is defined as the diameter of the ring. In the case that the diameter of the interconnect is smaller than the stated 0.25 ratio, it is preferred that more then one virtual interconnect is used for a single section.

In a further embodiment, at least one through-hole is present in the movable element, which extends through the mechanical layer and one section in the intermediate layer. With this through-hole etchant is supplied effectively in order to remove a sacrificial layer between the first and the second electrode. Moreover, the presence of the through-hole in this area reduces the mass of the movable element in the area that should be moved. As such, it contributes to a reduction of the actuation voltage.

Suitably, the second electrode comprises etch holes that have a smaller diameter than that of the through-hole. It is considered advantageous that a pattern of etch holes is present in the second electrode. Due to the presence of the intermediate layer, the pattern of etch holes can be defined independently from that in the mechanical layer. Since the intermediate layer is substantially thinner than the mechanical layer, the resolution of the patterns can be higher, and the etch holes can be smaller. The intermediate layer preferably has only a fifth and more preferably only a tenth of the thickness of the mechanical layer.

In another embodiment, the element is provided with a venting channel in its second, closed position, of which venting channel spaces between the sections and the interconnects are part. The fluid may be a gas, e.g. air or nitrogen. The venting channels run mainly parallel to the facing surfaces. The channels preferably end up in a vertical venting hole or at the side of the surface. The venting channels may extend into and along the substrate e.g. by partial removal of the substrate with a substrate transfer technique. Therewith the channels allow fluid to enter the area between the facing surface and damping of the movement of the moveable element to be controlled. Usually it is desired to increase the flow entering or exiting the area between the facing surfaces, to reduce such damping, and hence increase speed of opening and closing of the device. Much of the opening delay is concerned with the initial stage of opening, since the electrostatic attraction is greatest when the electrodes are closest. Usually the electrostatic force during opening is close to 0 because the actuation voltage is turned off. This is also where air damping is high because the air has least space to move. Similarly for device closing, the reduction in damping will be most pronounced at the final stage of closing for the same reasons. As this is where most of the closing delay occurs, the channels can enable a notable increase in closing speed. The benefits in terms of speed can be traded for other advantages such as reducing drive voltage or spring rate for a given speed, or using a higher operating pressure or higher viscosity fluid for a given speed for example. Another use for the channels could be to allow fluid to be forced in between the facing surfaces when closed, to help force them apart, to increase opening speed or overcome stiction.

In again another embodiment, the mechanical layer is provided with at least one movable section of which the second electrode is part, that is coupled to a main section of the movable element by a resilient coupling. This is shown in FIG. 2b. The independently movable section allows movement of the movable element towards the substrate of the movable element in two modes. As a result, not the complete movable element, but only the independently movable section or alternatively only the main section of the movable element will be attached to the substrate. The problem of stiction is therewith reduced, in that first of all, the attached area is reduced and secondly, the resilient coupling provides an inherent counterforce.

Preferably, further having one or more flexible elements coupled to provide a force on the movable element dependent on the movement and being present between the movable element and one or more protrusions on a substrate. Such flexible elements or spring structures are known per se from U.S. Pat. No. 6,557,413. Therewith, the movable element is attached to the substrate only in limited areas, and may as a whole, be moved towards and from the first electrode more easily.

In an even further embodiment, an anti-stiction bump is defined in the intermediate layer, and connected to the mechanical layer with a vertical interconnect. Such an anti-stiction bump is located opposite an area on the substrate that is free of any electrode. As such the bump will not be charged, and the bump is not prone to stiction. Preferably, the vertical interconnect of the bump has a diameter in a plane parallel to the intermediate layer, that is smaller than that of the bump surface in the intermediate layer. This has been found to provide a good bumping surface.

It is highly preferred if there is both a resilient coupling in the mechanical layer and an anti-stiction bump. It has turned out that the effective elastic constant of the spring structure gets higher when the anti-stiction bump is in contact with the substrate. As a result, the upwards force will be increased.

As will be understood, one or more actuation electrodes are needed in the event that the MEMS element does not have a sensing function, but must be actively addressed, i.e. as a switch or a tunable capacitor. The actuation electrode may be implemented in the first electrode, but preferably one or more independent actuation electrodes are present. In one advantageous embodiment of the invention, actuation electrodes are defined in the intermediate layer and are not divided into several sections. With this construction, the minimum distance between the actuation electrodes on the movable element and on the substrate is larger than the minimum distance between the first and second electrodes.

The MEMS element of the invention is very suitable for application as a capacitor, but also as a switch.

In a further embodiment, a thin-film capacitor is present adjacent to the MEMS element, said thin-film capacitor provided with a first electrode on the first side of the substrate and a second electrode in the intermediate layer, between which electrodes a layer of dielectric material is present. The device of the invention, with a metal layer on the substrate, an intermediate layer (generally of metal), and a mechanical layer (for instance of metal), allows the effective integration of thin film capacitors with MEMS elements. This is achieved by selectively etching away sacrificial layers. The selective etching can be a matter of flow of etchant. Preferably, the MEMS element is surrounded by any ring of non-etchable material to limit the flow of etchant. This ring is for instance the support through which the movable element is attached to the substrate, however it may be a separate ring as well, or part of the package of the MEMS element. In case that the mechanical layer is a metal, it is highly suitable for definition of inductors and the like elements.

The present device can be suitably made by etching away any sacrificial layers between the substrate, the intermediate layer and the mechanical layer with the help of etching. This is known per se in the art. Use is preferably made of dry etching, but wet etching could be applied alternatively with the desired result. A fluorine-containing dry etchant is preferred, and suitably the substrate is protected with a etch-stop layer that is resistant against such a fluorine-containing dry etchant.

BRIEF DESCRIPTION OF THE DRAWINGS

These and other aspects of the device of the invention will be further illustrated with respect to the drawings, in which.

DETAILED DESCRIPTION OF ILLUSTRATIVE EMBODIMENTS

Figure 1:
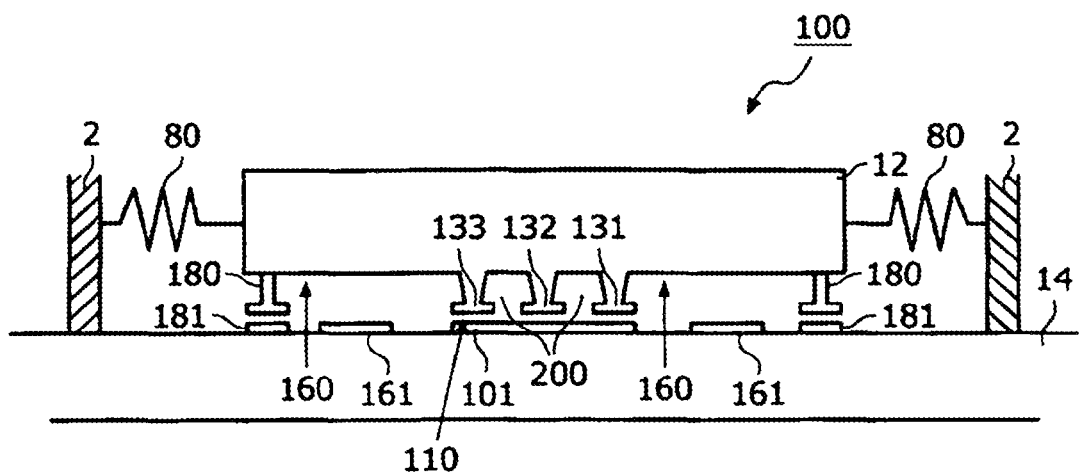
FIG. 1 shows a diagrammatical view of a MEMS element.

Equal reference numerals in different figures refer to equal constituents. The figures are not drawn to scale and only of a diagrammatical nature.

Figure 2A:
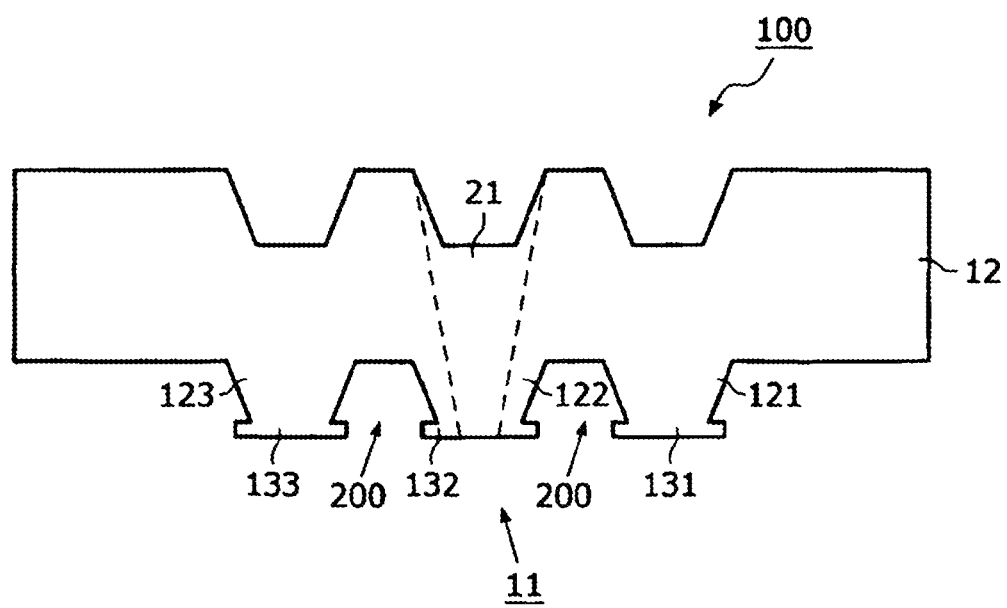
FIG. 2a shows an embodiment of a detail of FIG. 1, which illustrates the invention.

FIG. 1 shows a diagrammatical view of a MEMS element, and FIG. 2a shows a detail hereof. It comprises a movable element 100 with a second electrode 11, that is facing a first electrode 101 and separated therefrom by an air gap 110. The first electrode 101 is present on a substrate 14. Protrusions 2 are present on this substrate 14, to which the movable element 100 is mechanically connected with flexible elements 80. The movable element 100 has as its main layer a mechanical layer 12, which is designed to provide the mechanical stability. It is in this example a metal or alloy, but that is not necessary. An insulating layer may be used that solely has a support function. Alternatively, the mechanical layer may be a piezoelectric layer that may expand so as to provide any needed actuation. Generally, the mechanical layer 12 is a layer with a thickness in the order of one micron or more. The movable element 100 further comprises anti-stiction bumps 180, that define a minimal distance and support the planarity of the movable element 100. Non-charged counters 181 are present on the substrate 14. The movable element 100 comprises actuation electrodes 160 adjacent to the second electrode 11. The actuation electrodes 160 may be completely or substantially ring-shaped so as to circumference the second electrode 11 and constitute effectively one electrode. Alternatively, more than one actuation electrode 160 is used. Counter electrodes 161 are present opposite to the actuation electrodes 160 on the substrate 14.

Figure 2B:
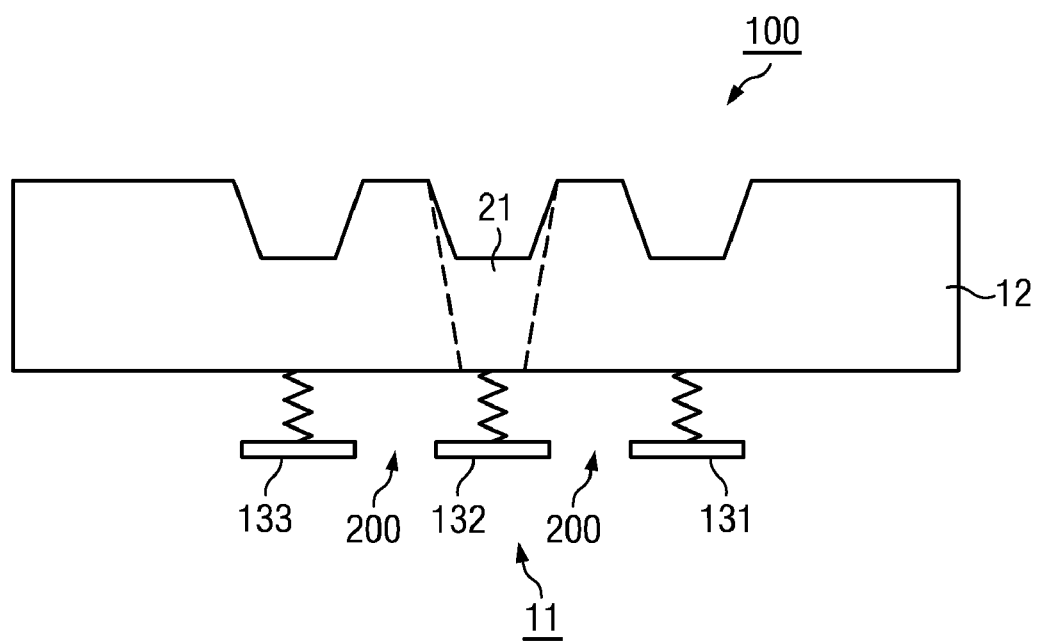
FIG. 2b shows an embodiment of a detail of FIG. 1, which illustrates the invention.

Similarly to FIG. 2a, FIG. 2b shows the movable element 100 with a resiliently coupled second electrode 11.

According to the invention, the second electrode 11 comprises a plurality of independent sections 131, 132, 133, which are connected to the mechanical layer 12 with vertical interconnects 121, 122, 123. The result is a segmented second electrode 11. A venting channel 200 is defined by the areas in between of the vertical interconnects 121, 122, 123, when the element is closed and the second electrode 11

Figure 3:
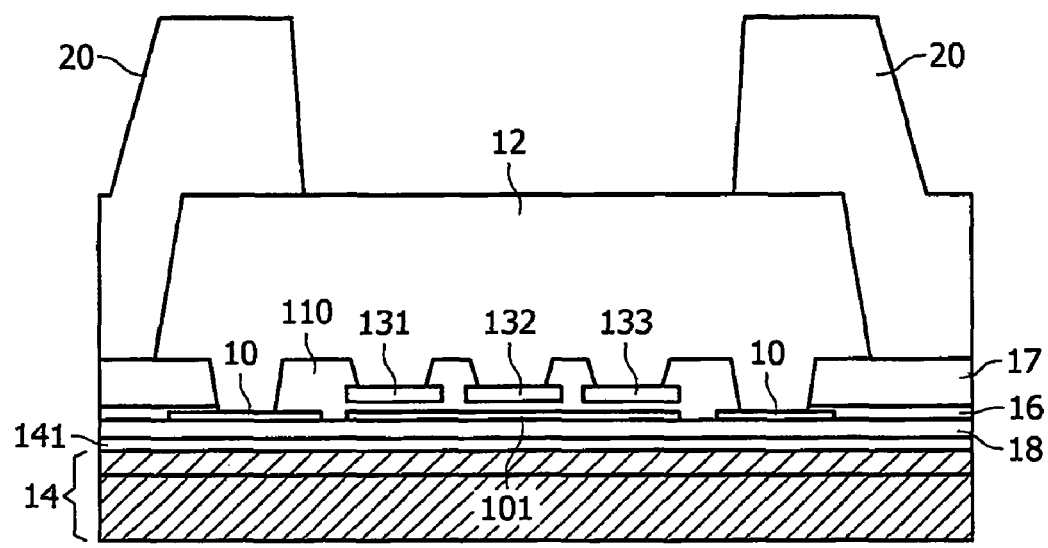
FIG. 3 shows in a diagrammatical, cross-sectional view, an embodiment of the device of the invention.

FIG. 3 shows an embodiment of the device of the invention. The device comprises a substrate 14, here of silicon with an oxide layer 141. Hereon, an etch-stop layer 18 and a base layer 10 are present. The etch-stop layer 18 is preferably an etch-stop layer against a fluorine plasma etchant. The etch-stop layer 18 preferably comprises any one of the Group IV-oxides, such as $Al_2O_3$, $HfO_2$, $ZrO_2$ and $TiO_2$. In one preferred embodiment, the etch-stop layer 18 may comprise $Al_2O_3$ of a thickness of for instance 100 nm.

The first electrode 101 is defined in the base layer 10. It is separated from a second electrode 11 with an air gap 110. This air gap 110 has been formed by selective removal of a first sacrificial layer 16 and a second sacrificial layer 17. The sacrificial layers 16 and 17 may, for example, consist of Si, $Si_3N_4$, $SiO_2$, W, Mo, but also of any polymeric material, or any ferroelectric material. A mechanical layer 12 is present on top of the air gap 110 and the second sacrificial layer 17, as far as it has not been removed. Vertical interconnects 121, 122, 123 connect the different sections 131, 132, 133 of the second electrode 11 to the mechanical layer 12. The mechanical layer 12 and the base layer 10 consist of conductors, such as Al, Ni, Au, Cu or Pt. In this embodiment, aluminum conductors have been used for the base layer, and an alloy of $Al_{0.98}Cu_{0.02}$ has been used for the mechanical layer. The first electrode 101 and/or the second electrode 11 may be provided with a native oxide layer, that is created by a treatment with a suitable plasma etch.

A mask 20 is applied on top of the mechanical layer 12. This mask 20 includes a window 21 to the sacrificial layer 17. For the mask 20, use is made of a polyimide with a thickness of about 5 μm. This is suitable in view of the thickness of the mechanical layer 12, for instance 1 μm, and offers sufficient protection against a plasma etchant, for instance a fluorine plasma. However, it is not excluded that the etching treatment may be carried out with wet-chemical etching. In that case, the etch-stop layer 18 need not to be present, or can be chosen differently.

After the etching step to remove the sacrificial layers 16,17 the mask 20 need not to be removed. In this example, it constitutes part of the movable element of the MEMS element. In addition, it may act as a passivation layer for other elements in the device. The mask 20 may further be used to provide further metal layer according to a desired pattern that can be used as contact pads, and as sealing ring for an hermetic package.

Figure 4:
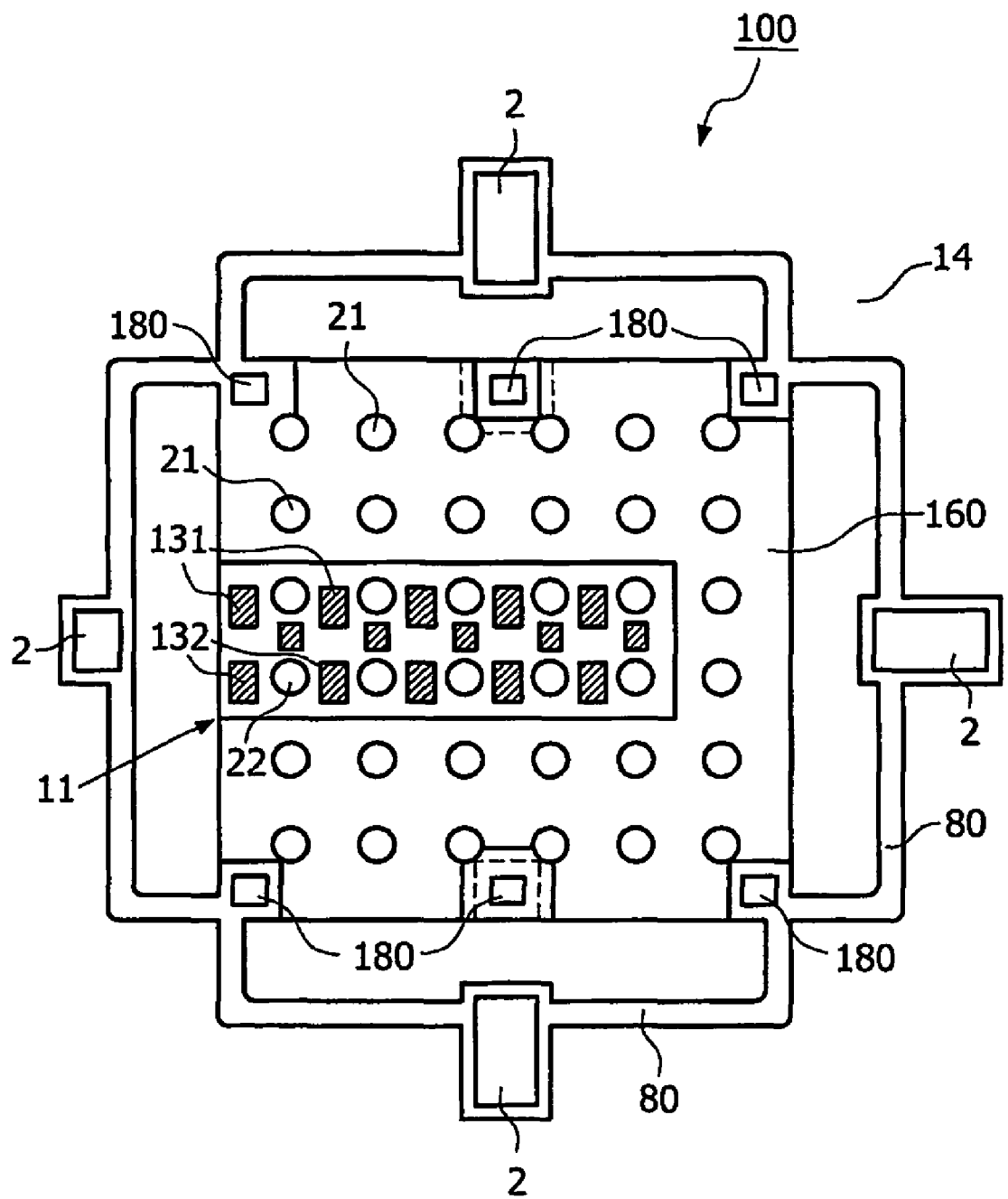
FIG. 4 shows a top view of an embodiment.

FIG. 4 shows a top view of the movable element 100 in one embodiment. The movable element 100 is attached to protrusions 2 on the substrate 14 with flexible elements 80. Anti-pull in bumps or anti-stiction bumps 180 are present at the corners of the movable element 100. A U-shaped area of the movable element 100 is in use as the actuation electrode 160. Etch holes 21 are present herein. The second electrode 11 is located within the U-shaped actuation electrode 160. It is provided with etch holes 22. It is provided with a plurality of sections 131, 132 that define the actual electrode surface.

Figure 5:
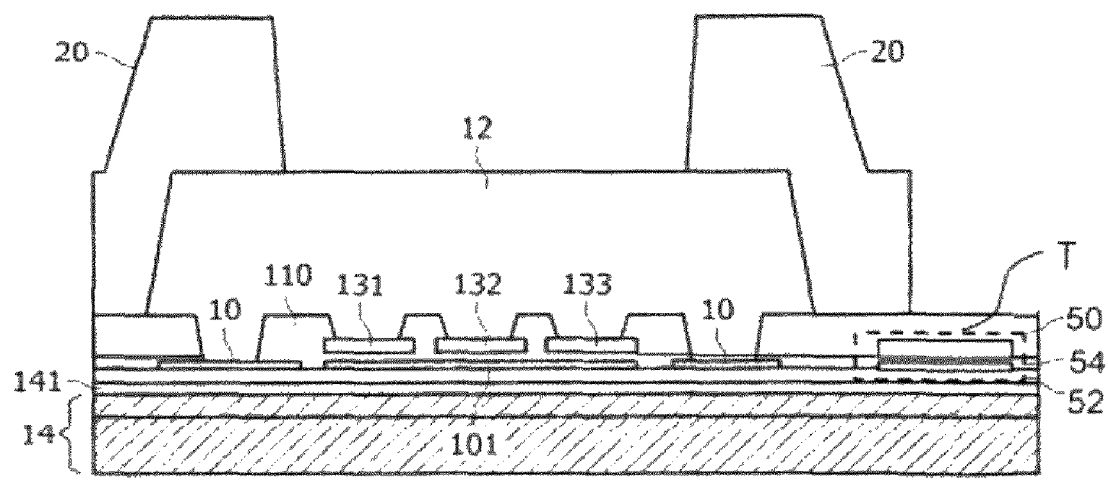
FIG. 5 shows in a diagrammatical, cross-sectional view, another embodiment of the device of the invention.

FIG. 5 shows in a diagrammatical, cross-sectional view, another embodiment of the device of the invention. FIG. 5 is the same as FIG. 3 but also shows a thin-film capacitor T adjacent to the MEMS element. The thin-film capacitor T is provided with a first electrode 52 on the first side of the substrate 14 and a second electrode 50 in the intermediate layer. A layer of dielectric material 54 is present between the electrodes 50 and 52.

The invention claimed is:

1. An electronic device comprising a micro-electromechanical systems (MEMS) element, the MEMS element comprising:
    a first electrode;
    a movable element comprising a mechanical layer and a second electrode, the second electrode movable towards and from the first electrode between a first position and a second position, the second electrode being separated from the first electrode by a gap in its first position,
    wherein the second electrode comprises a plurality of segments in a plane parallel to a main plane of the first electrode, each of the segments being mechanically connected by a separate vertical interconnect to the mechanical layer, wherein each vertical interconnect has, in a plane parallel with a main surface of the movable element, a horizontal cross-sectional area that is smaller than a horizontal cross-section area of a section of the second electrode that is connected thereto.

2. The electronic device as claimed in claim 1, wherein the movable element includes at least one etch hole that extends through the mechanical layer and one segment in the second electrode.

3. The electronic device as claimed in claim 2, wherein the MEMS element is provided with a venting channel in the second position, the venting channel including venting channel spaces between the segments and the interconnects.

4. The electronic device as claimed in claim 1, further comprising one or more flexible elements between the movable element and one or more protrusions on a substrate, the flexible element coupled to provide a force on the movable element.

5. The electronic device as claimed in claim 1, wherein the MEMS element further comprises at least one anti stiction bump.

6. The electronic device as claimed in claim 1, wherein the MEMS element further comprises at least one actuation electrode.

7. The electronic device as claimed in claim 1, wherein the segments of the second electrode and the mechanical layer comprise different materials.

8. The electronic device as claimed in claim 1, further comprising a thin-film capacitor adjacent to the MEMS element.

9. The electronic device as claimed in claim 8, wherein the first electrode of the MEMS element is formed on a substrate, the thin-film capacitor comprising:
   a first capacitor electrode on the substrate;
   a second capacitor electrode defined in the second electrode layer; and
   a layer of dielectric material between the first capacitor electrode and the second capacitor electrode.

10. The electronic device as claimed in claim 1, wherein the mechanical layer comprises a metal.

11. The electronic device as claimed in claim 1, further comprising a flexible element attached to the movable element.

12. The electronic device as claimed in claim 1, wherein the movable element comprises a movable segment that is connected to a segment of the second electrode via the vertical interconnect connected to that segment of the second electrode.

13. A micro-electromechanical systems (MEMS) element, comprising:
   a substrate;
   a first electrode disposed on the substrate;
   a movable element disposed over the substrate and movable towards and from the substrate;
   at least three second electrodes disposed on the movable element, wherein the three second electrodes are in a plane parallel to a main plane of the first electrode and separated from each other, each second electrode overlying the first electrode, the second electrodes movable towards and from the first electrode between a first position and a second position, the second electrodes being separated from the first electrode by a gap in its first position; and
   at least three vertical interconnects, each vertical interconnect mechanically connecting a respective second electrode to the movable element, wherein each vertical interconnect has, in a plane parallel with a main surface of the movable element, a horizontal cross-sectional area that is smaller than a horizontal cross-section area of one of the second electrodes that is connected thereto.

14. The MEMS element as claimed in claim 13, wherein the second electrodes are disposed at a central portion of the movable element.

15. The MEMS element as claimed in claim 14, further comprising a first anti-stiction bump at a first end of the movable element and a second anti-stiction bump at a second end of the movable element, the central portion located between the first end and the second end.

16. The MEMS element as claimed in claim 13, further comprising first and second actuation electrodes disposed on the movable element.

17. The MEMS element as claimed in claim 16, wherein the second electrodes are located between the first actuation electrode and the second actuation electrode.

18. The MEMS element as claimed in claim 13, further comprising at least one protrusion extending from the substrate, the movable element being connected to the protrusion by a flexible element.

* * * * *